Nov. 21, 1944.         C. H. JENNINGS ET AL         2,363,332
                    ARC-STABILIZING CIRCUIT
                      Filed Dec. 3, 1942

WITNESSES:                                    INVENTORS
E. G. McCloskey                           Alfred B. White and
G. V. Giolma        Fig. 5.               Charles H. Jennings.
                                          BY
                                          J. M. Crawford
                                                ATTORNEY Patented Nov. 21, 1944

2,363,332

UNITED STATES PATENT OFFICE 2,363,332

ARC-STABILIZING CIRCUITS

Charles H. Jennings, Forest Hills, and Alfred B. White, Murrysville, Pa., assignors to Westinghouse Electric & Manufacturing Company, East Pittsburgh, Pa., a corporation of Pennsylvania Application December 3, 1942, Serial No. 467,719

6 Claims. (Cl. 315—174)

Our invention relates generally to arc-stabilizing circuits and systems, and it has reference in particular to means for controlling the application of relatively high-frequency arc-stabilizing voltages to alternating-current arc-welding circuits or systems and the like.

Generally stated, it is an object of our invention to provide for controlling the application of relatively high-frequency arc-stabilizing voltages to relatively low-frequency arc-welding circuits in a manner that is both simple and inexpensive.

More specifically, it is an object of our invention to provide for controlling the application of a relatively high-frequency arc-stabilizing voltage to a relatively low-frequency arc-welding system so as to prevent stinging or burning of a welding operator during periods of non-welding.

We further propose to provide for reducing the value of the high-frequency arc-stabilizing voltage during non-welding periods to prevent stinging the operator and yet retain said voltage at a value sufficiently high to facilitate completing a circuit between the welding electrode and the work upon which a welding operation is to be performed.

It is also an object of our invention to provide for controlling the energy supplied to the high-frequency generator of an arc-stabilizing circuit in response to predetermined conditions in a welding circuit.

A further object of our invention is to provide for reducing a high-frequency arc-stabilizing voltage upon the lapse of a predetermined time after the welding circuit is interrupted.

Another object of our invention is to provide for controlling a high-frequency arc-stabilizing circuit in response to a predetermined condition of an associated arc-welding system including a welding transformer without requiring connections to the welding transformer other than at the usual terminals thereof.

Other objects will in part be obvious, and will in part be explained hereinafter.

In practicing our invention, a control relay is utilized to control the power supply, to and/or the voltage produced by a high-frequency generator used for supplying a relatively high-frequency arc-stabilizing voltage to a relatively low-frequency arc-welding circuit including a welding transformer and welding electrodes. Control of the relay is effected in response to circuit conditions produced upon completion of the welding circuit when the welding electrode is brought into contact with the work upon which the welding operation is to be performed. As soon as the welding circuit is thus completed, the high-frequency generator becomes fully energized and supplies the full arc-stabilizing voltage to the welding circuit in order to assist striking an arc between the electrode and the work. As soon as the arc is interrupted, or a predetermined time thereafter, the control relay operates to reduce or terminate the supply of electrical energy to the high-frequency generator, and/or the voltage output of the generator is thereby reduced so as to prevent an operator contacting the welding electrode from becoming stung or burnt thereby.

For a more complete understanding of the nature and scope of our invention, reference may be had to the accompanying drawing, in which:

Fig. 5 is a diagrammatic view of a modified arrangement of spark gaps which may be used in connection with the welding system shown in Fig. 4.

Figure 1:
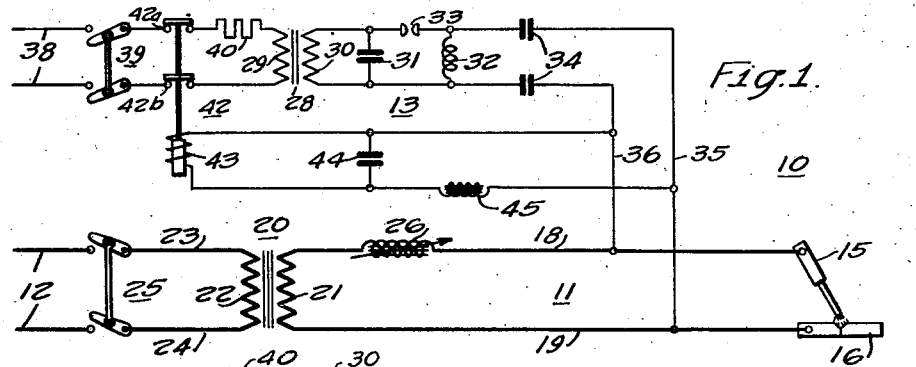
Figure 1 is a diagrammatic view of a welding system embodying the invention.

Referring to Figure 1, the reference numeral 10 may denote generally an arc-welding system, wherein a welding circuit 11 is arranged to be energized from a relatively low-frequency power source 12 and supplied with a relatively high-frequency arc-stabilizing voltage from a high-frequency generator 13.

The welding circuit 11 may, for example, comprise an electrode 15 for striking an arc on a workpiece 16 and a welding transformer 20 having a secondary winding 21 to which the electrode 15 and workpiece 16 are connected by conductors 18 and 19, respectively, as shown. The primary winding 22 of the welding transformer may be connected to the source 12 by means of conductors 23 and 24 and a suitable switch 25. A reactor 26 may be included in the welding circuit for stabilizing the voltage of the welding circuit.

The high-frequency generator 13 may be of any suitable type comprising, for example, a control transformer 28 having a primary winding 29 and a relatively high-voltage secondary winding 30. An oscillating circuit may be provided by connecting a condenser 31 and a suitable inductance 32 in parallel across the secondary winding 30 with a spark gap 33 in series circuit relation therebetween. Suitable circuit means may be provided for connecting the high-frequency generator 13 to the welding circuit 11, such as, for example, the coupling condensers 34 and the conductors 35 and 36. The condensers 34 also function to isolate the 60 cycle welding circuit voltage from the high frequency circuit. The primary winding 29 of the control transformer may be connected to a suitable source of alternating current, either to the source 12 or to a separate source as shown, by means of the conductors 38 and the switch 39. A current-limiting resistor 40 may be connected in series with the primary winding 29 to limit the current therethrough.

In order to provide for controlling the energization of the high-frequency generator 13, control means, such as the switch 42, may be utilized for controlling the connection of the primary winding 29 to the source. The operating winding 43 of the switch 42 may be connected across the secondary winding of the welding transformer 20, and the switch may be so designed that the voltage required for operation thereof is less than the open-circuit voltage of the welding circuit, but not substantially less than the highest arc voltage of the circuit. A bypass condenser 44 and choke 45 may be utilized to filter the high frequency from the operating winding 43.

When the switch 25 is closed to connect the welding transformer 20 to the source 12, the switch 42 immediately operates, opening contact members 42a and 42b so as to disconnect the control transformer 28 from the source, even though the switch 39 may be closed. Accordingly, the high-frequency generator 13 remains deenergized. As soon as the electrode 15 is brought into contact with the workpiece 16 to strike an arc for the commencement of a welding operation, the secondary winding 21 of the welding transformer is momentarily short-circuited. The voltage applied to the operating winding 43 of the switch 42 is reduced sufficiently thereby to cause the switch to return to the deenergized position. The primary winding 29 of the control transformer 28 is thereby connected to the source so that the high-frequency generator 13 immediately supplies a relatively high-frequency voltage to the welding circuit 11 to assist in producing and stabilizing the arc produced when the electrode 15 is withdrawn from the workpiece 16.

Figure 2:
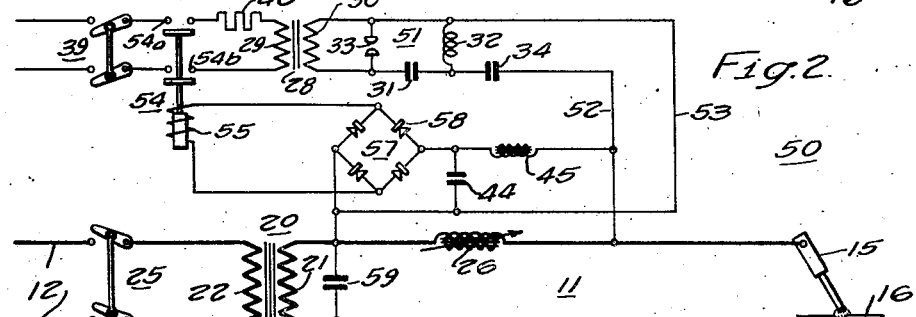
Fig. 2 is a diagrammatic view of a welding system embodying a modification of the invention.

Referring to Fig. 2, the reference numeral 50 may denote generally a welding system, wherein a high-frequency generator 51 having a spark gap 33 in shunt with an inductance 32 and a condenser 31 therebetween is used for supplying a relatively high-frequency arc-stabilizing voltage to a welding circuit 11 which may, as shown in Fig. 1, be energized from a relatively low-frequency source 12 by means of a welding transformer 20. The high-frequency generator 51 may be connected to the welding circuit 11 in a manner similar to that shown in Fig. 1, or may, for example, be connected by means of conductors 52 and 53 in shunt relation with the welding reactor 26. A condenser 34 may be used to block the 60 cycle current from the high frequency circuit.

Control of the energization of the high-frequency generator 51 may be effected by suitable switch means 54 which may be used to connect the primary winding 29 of the control transformer 28 to the source. Energization of the operating winding 55 of the switch 54 may be effected by connecting the operating winding 55 across the welding reactor 26, since the voltage drop across the reactor varies over a relatively small range during welding operations because of saturation of the reactor.

In order to produce a time delay in the operation of the switch 54, means, such as the rectifier circuit 57 of rectifier devices 58, may be connected between the operating winding 55 and the reactor 26 to rectify the voltage applied to the operating winding 55. A bypass condenser 44 and choke 45 may be provided, as in Fig. 1, to filter the high-frequency voltage from the switch circuit, and a bypass condenser 59 may be provided to filter the high frequency from the welding transformer.

When the switch 25 is closed to connect the primary winding 22 of the welding transformer 20 to the source 12, the switch 54 remains in the deenergized position, since there is no voltage drop across the reactor 26. As soon as the electrode 15 contacts the workpiece 16, a voltage drop appears across the reactor 26. This voltage is rectified by the rectifier circuit 57 and applied to the operating winding 55 of the switch 54. The switch 54 operates connecting the primary winding 29 of the control transformer to the source through contact members 54a and 54b to effect energization of the high-frequency generator 51. A relatively high-frequency voltage is applied thereby across the reactor 26 and becomes available between the electrode 15 and the workpiece 16 to assist in striking and stabilizing an arc therebetween.

When the welding circuit is interrupted, the voltage across the reactor 26 disappears. However, the switch 54 remains in the closed position for a predetermined time, since the rectifier circuit 57 acts as a substantially short-circuiting shunt across the operating winding 55 and prevents rapid decay of the magnetic flux produced thereby. During this interval, the high-frequency generator 51 remains energized, and the high-frequency arc-stabilizing voltage is available between the electrode 15 and the workpiece 16 to assist in reestablishing and maintaining an arc should the operator bring the electrode into engagement with the workpiece 16 during this interval. At the end of the predetermined interval, the switch 54 returns to the deenergized position, and the high-frequency generator 51 is deenergized.

Figure 3:
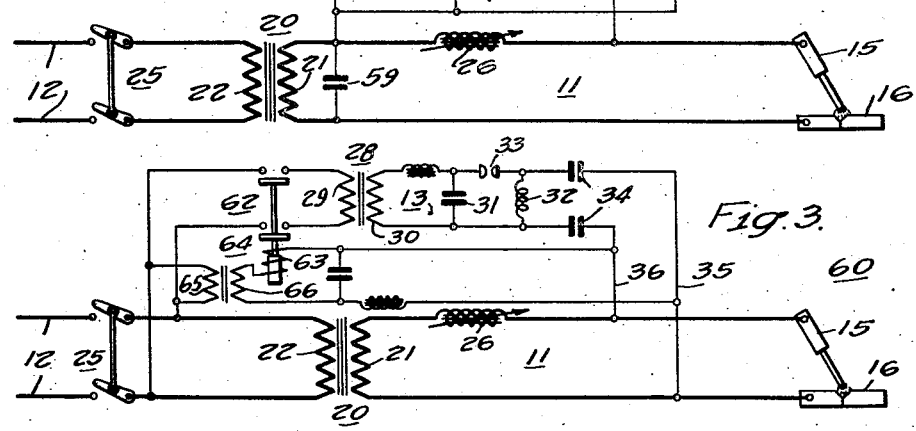
Fig. 3 is a diagrammatic view of a welding system embodying a further modification of the invention.

In Fig. 3, the reference numeral 60 may denote a welding system wherein the welding circuit 11 may be connected to the source 12 by means of a welding transformer 20 in a similar manner to that shown in Figs. 1 and 2. Likewise, the high-frequency generator 13 may be connected by means of a control transformer 28 to a suitable source of alternating current and may be connected to the welding circuit by means of condensers 34 and conductors 35 and 36 in a manner similar to that shown in Fig. 1.

Energization of the control transformer 28 may be effected by suitable switch means 62 provided with an operating winding 63. In order to provide for controlling the energization of the operating winding 63, suitable means may be provided for producing a substantially constant control voltage approximately equal to the open-circuit voltage of the welding circuit 11. For example, a control transformer 64 may be provided having a primary winding 65 connected to the source 12 and a secondary winding 66 which may be connected to the operating winding 63 in opposed relation to the secondary winding 21 of the welding transformer 20.

When the welding transformer 20 is connected to the source 12 with the welding circuit 11 open, the voltages produced by the secondary windings 66 and 21 of the control and welding transformers, respectively, are substantially in phase and are substantially equal and opposite. Accordingly, no voltage appears across the operating winding 63, and the switch 62 remains in the deenergized position.

When the electrode 15 engages the workpiece 16, the voltage across the secondary winding 21 of the welding transformer 20 is reduced and its phase relation changes. Accordingly, a differential between the voltages of the windings 66 and 20 appears across the operating winding 63 of the switch 62 sufficient to operate the switch. The high-frequency generator 13 is thereupon energized and applies a high-frequency arc-stabilizing voltage to the welding circuit 11. When the welding circuit is interrupted, the voltages across the windings of the control and welding transformers again become substantially equal and opposite, so that the switch 62 returns to the deenergized position. The high-frequency generator 13 is thereby deenergized, removing the high-frequency voltage from the welding circuit.

Figure 4:
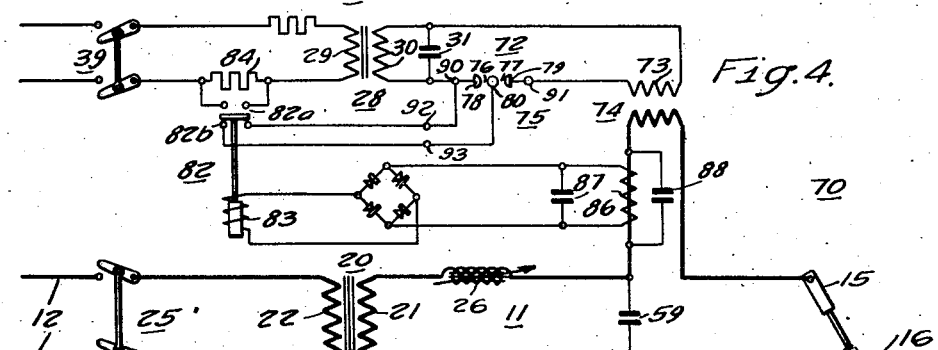
Fig. 4 is a diagrammatic view of a welding system embodying another modification of the invention.

Referring to Fig. 4, the reference numeral 70 may denote generally a welding system, wherein a relatively low-voltage arc-welding circuit 11 is connected to a source 12 by means of a welding transformer 20. A high-frequency generator 72 may be utilized for producing a high-frequency arc-stabilizing voltage between the welding electrode 15 and the workpiece 16 upon which a welding operation is to be performed.

The high-frequency generator 72 may be of any suitable type comprising, for example, a condenser 31 connected across the relatively high-voltage secondary winding 30 of a control transformer 28 with the primary winding 73 of an air core transformer 74, which may be used for coupling the generator to the welding circuit, connected in shunt relation therewith. Instead of utilizing a single spark gap 33 such as shown in Figs. 1 through 3, a multiple spark gap 75 may be connected in series circuit relation with the condenser 31 and the inductive primary winding 73. In this instance the multiple spark gap comprises a pair of serially related spark gaps 76 and 77 provided by spaced electrodes 78 and 79 and an intermediate electrode 80.

In order to control the operation of the high-frequency generator 72, a suitable switch 82 having an operating winding 83 may be provided. Normally open contact members 82a of the switch may be connected in shunt circuit relation with a control resistor 84 which may be normally arranged to reduce the energization of the high-frequency generator to a predetermined value. Normally closed contact members 82b of the switch may be connected in shunt circuit relation with the electrode 78 and the intermediate electrode 80 of the multiple spark gap. A single moving contact member may be used for bridging both sets of fixed contact members, as shown, or separate moving contact members may be used in order to more effectively insulate the high-frequency circuit from the low frequency circuit. Energization of the operating winding 83 may be effected in any suitable manner, such as by connecting the winding to a current transformer 86 in the welding circuit 11. If it is desired to provide the switch 82 with time-delay characteristics, a rectifier circuit 57 may be connected intermediate the operating winding 83 and the current transformer 86 to act as a short-circuiting shunt when the operating winding is deenergized. Condensers 87 and 88, may be employed for by-passing the high frequency from the control circuit.

When the welding transformer 20 is connected to the source 12 by means of the switch 25 with the welding circuit 11 open, the switch 82 remains in the deenergized position, since no voltage appears across the current transformer 86. The control resistor 84 is, therefore, effective to reduce the energization of the high-frequency generator 72, and the effective length of the spark gap thereof is reduced, since the gap 76 is short-circuited through the contact members 82b, whereby the high-frequency voltage of the generator 72 is reduced to a predetermined safe value which will not sting or burn the operator, but is of sufficient value to assist in making contact between the electrode 15 and the workpiece 16 through any dirt, scale, oxide, etc., which may exist.

When the electrode 15 is brought into engagement with the workpiece 16, the reduced high-frequency voltage produced by the high-frequency generator 72 assists in establishing the flow of current between the electrode 15 and the workpiece 16. Upon the flow of welding current, a voltage appears across the secondary winding of the current transformer 86, energizing the operating winding 83 and causing the switch 82 to operate to the energized position. The control resistor 84 is thereby shunted so that normal energization of the control transformer 28 is effected. At the same time, the shunt across the gap 76 is removed so that the effective length of the spark gap in the high-frequency generator 72 is increased, thus increasing the arc-stabilizing voltage applied to the welding circuit 11.

When the welding circuit 11 is interrupted, the switch 82 remains in the energized position for a predetermined time because of the short-circuiting effect of the rectifier circuit 57 which is connected across the operating winding 83 of the switch. The high-frequency generator 72 thus remains fully energized and applies the full high-frequency voltage to the welding circuit 11 for a predetermined interval after the welding circuit is interrupted, so as to assist the operator to rapidly restrike and maintain the arc, if it should be so desired.

Referring to Fig. 5, the reference numeral 85 may denote generally a multiple gap system which may be substituted for the multiple gap system 75 shown in Fig. 4. The substitution may be made by connecting the terminals 90 through 93 of Fig. 5 to the corresponding terminals indicated in Fig. 4. Instead of utilizing a plurality of serially related arc gaps, as shown in Fig. 4, a pair of shunt related spark gaps 94 and 95 may be used. For example, the spark gap 95, which is normally arranged to be connected in parallel with the spark gap 94 by the contact members 82b, may be shorter than the spark gap 94. Thus, when the switch 82 is in the deenergized position, the spark gap 95 controls the voltage of the high-frequency circuit so that the voltage thereof is reduced to a predetermined safe value. When the switch 82 is energized, the spark gap 95 is effectively disconnected so that the spark gap 94 controls the voltage of the high-frequency generator, and the voltage is raised to the predetermined desired operating value. In other respects the system with which the arrangement of Fig. 5 is used, may be substantially the same as that shown in any of the other figures. The features of the different systems may be used together or singly, or they may be interchanged among the different systems as desired.

From the above description and the accompanying drawing, it will be apparent that we have provided in a simple and effective manner for controlling the energization and/or voltage of a high-frequency generator utilized for stabilizing the arc in a relatively low-voltage, low-frequency, arc-welding system. It will be apparent that either a reduction of energy or of voltage may be used to accomplish our purpose or both may be used together without departing from the scope of the invention. Since the control apparatus embodying our invention is substantially distinct from the welding transformer, it may be readily applied to welding transformers of different makes and designs which may have been in use without such features for some time or may be in the process of manufacture. An arc-stabilizing system embodying the features of our invention is simple and inexpensive to manufacture and reliable in operation. Stinging or burning of the operator by reason of the usual relatively high-frequency voltage is prevented, and yet the benefits of a high-frequency voltage in completing the welding circuit and striking the arc may be retained.

Since certain changes may be made in the above description and different embodiments of the invention may be made without departing from the spirit or scope thereof, it is intended that all the matter contained in the above description or shown in the accompanying drawing shall be considered as illustrative and not in a limiting sense.

We claim as our invention:

1. The combination with a relatively low frequency arc circuit, of means producing a relatively high-frequency arc-stabilizing voltage in the arc circuit, control means effective to change the output of said means, and circuit means controlling the operation of the control means in response to predetermined arc-circuit conditions so that a relatively high arc stabilizing voltage is produced while the arc circuit is closed, and a relatively low voltage which assists in completing the arc circuit but does not burn or sting an operator is produced when the arc circuit is interrupted.

2. An arc-stabilizing system for use with a welding circuit including a welding transformer device having a relatively high reactance and disposed to be connected to a relatively low frequency source comprising, a high-frequency generator arranged to supply a relatively high-frequency arc-stabilizing voltage of a relatively high arc-stabilizing value to the welding circuit, normally deenergized relay means operable to effect energization of the high-frequency generator, a control transformer having a primary winding disposed to be connected to the low frequency source and a secondary winding with a voltage substantially equal to the open-circuit voltage of the welding circuit, and circuit means connecting the secondary winding of the control transformer in opposed voltage relation to the welding circuit to produce a control voltage for effecting operation of the relay means when the welding circuit is completed to energize the high frequency generator.

3. An arc-stabilizing system for a welding circuit arranged to be energized from a relatively low-frequency alternating-current source comprising, a high-frequency generator energizable to supply arc-stabilizing energy of a relatively high frequency to the welding circuit at a relatively high arc-stabilizing voltage, means effective to reduce the energy supplied to the welding circuit by the frequency generator to a predetermined lower operating value whereby no stinging or burning effect is produced on an operator, and control means responsive to a circuit condition in the welding circuit operable to render said means effective a predetermined time after the welding circuit is interrupted.

4. An arc-stabilizing system for an arc circuit in a relatively low-frequency arc-welding system comprising, a high-frequency generator including a spark gap arranged to produce a relatively high-frequency arc-stabilizing voltage in the welding system, and means to increase the value of the high frequency voltage from a relatively low value which assists in completing an arc circuit but does not harm the operator to a relatively high arc-stabilizing value by increasing the effective length of the spark gap in response to a completion of an arc circuit in the welding system.

5. An arc-stabilizing system for stabilizing an arc in a relatively low-frequency arc-welder circuit comprising, a high-frequency generator including an oscillatory circuit and a plurality of serially related spark gaps arranged to produce a high-frequency voltage of predetermined value in the arc-welding circuit normally, and control means normally effective to render one of said spark gaps ineffective so as to produce a high frequency voltage of a relatively low value which assists in completing the arc welder circuit but does not burn or sting an operator and operable in response to energization of the welding circuit to render said spark gap effective, whereby the voltage produced by the generator is increased to an effective arc-stabilizing value.

6. An arc-stabilizing system for stabilizing an arc in a relatively low-frequency arc-welding circuit comprising, a high-frequency generator including an oscillatory circuit and a plurality of parallel spark gaps of different lengths arranged to produce a high-frequency voltage of different predetermined values in the arc-welding circuit normally, and control means normally effective to render one of said spark gaps ineffective so as to produce a high frequency voltage of a relatively low value which will not sting or burn an operator and operable in response to energization of the welding circuit to render said spark gap effective, whereby the voltage produced by the generator is increased to an effective arc stabilizing value.

CHARLES H. JENNINGS.
ALFRED B. WHITE.